United States Patent [19]

Sternlieb

[11] Patent Number: 4,863,776
[45] Date of Patent: Sep. 5, 1989

[54] CHAIN STITCHED FABRIC STRUCTURE

[76] Inventor: Herschel Sternlieb, 21 McKeen St., Brunswick, Me. 04011

[21] Appl. No.: 149,689

[22] Filed: Jan. 28, 1988

[51] Int. Cl.⁴ .............................................. B32B 3/06
[52] U.S. Cl. ................................. 428/102; 428/294; 112/420; 112/440
[58] Field of Search .............. 428/102, 286, 287, 288, 428/294, 299

[56] References Cited

U.S. PATENT DOCUMENTS

| | | | |
|---|---|---|---|
| 4,079,568 | 3/1978 | Wortman | 53/23 |
| 4,518,640 | 5/1985 | Wilkens | 428/102 |
| 4,756,942 | 7/1988 | Aichele | 428/102 |

Primary Examiner—Marion C. McCamish
Attorney, Agent, or Firm—Cobrin, Feingertz & Gittes

[57] ABSTRACT

A fabric includes an intermediate layer of substantially parallel spun warp yarns, the intermediate layer having a first surface and an opposite, second surface; a top backing layer formed of spun bonded non-woven fibers on the first surface of the intermediate layer; a bottom backing layer of spun bonded non-woven fibers on the opposite, second surface of the intermediate layer; a chain stitching extending substantially parallel to and between adjacent spun warp yarns to connect the top layer to the bottom layer and thereby secure the warp yarns therebetween; and the stitched fabric being hydraulically entangled to adhere the loose warp yarns to the spun bonded non-woven yarns of the top and bottom backing layers.

11 Claims, 2 Drawing Sheets

CHAIN STITCHED FABRIC STRUCTURE

BACKGROUND OF THE INVENTION

This invention relates generally to a fabric structure and, more particularly, is directed to a fabric having superb filling strength without using any filling yarns.

In most stitch bonding and weft insertion fabrics utilizing decorative warp yarns, the warp yarns are adhered to the filling yarns and/or a backing by means of a tricot stitch that encases the warp. This type of stitching, however, adds to the complexity of the fabric structure. In addition, the dimensional stability of such fabrics is not very great.

Alternatively, it is known to stitch through a wrapped yarn with a chain stitch such that the yarn is adhered to the surface of the backing where the stitching yarn secures the wrap yarn.

In either case, a filling yarn is required to provide filling strength and to impart abrasion resistance to the fabric. The use of filling yarns, however, may be undesirable. First, the production efficiency of the fabric is relatively low when using filling yarns. This is because there is normally filling breakage, and the machinery for making the fabric cannot operate at maximum speed due to limitations forced on the machinery by the speed of the filling carriage.

OBJECTS AND SUMMARY OF THE INVENTION

Accordingly, it is an object of the present invention to provide a fabric structure having a great filling strength without the use of any filling yarns.

It is another object of the present invention to provide a fabric structure in which the filling strength is achieved by spun bonded non-woven yarns, which also impart abrasion resistance to the fabric structure.

It is still another object of the present invention to provide a fabric structure in which spun warp yarns impart bulk, opacity and a uniform appearance to the fabric structure.

It is yet another object of the present invention to provide a fabric structure in which spun warp yarns are encased by spun bonded non-woven yarns by means of a chain stitch.

It is a further object of the present invention to provide a fabric structure of the aforementioned chain stitch type having greater dimensional stability than tricot stitched fabrics.

It is a still further object of the present invention to provide a fabric structure of the aforementioned type in which the production efficiency is greatly improved.

It is a yet further object of the present invention to provide a fabric structure having superb drapability.

It is another object of the present invention to provide a fabric structure of the aforementioned type having particular applicability for use in vertical blinds, pleated shades, draperies, bedspreads and other apparel applications.

In accordance with an aspect of the present invention, a fabric includes an intermediate layer of substantially parallel warp yarns, the intermediate layer having a first surface and an opposite, second surface; a top backing layer on the first surface of the intermediate layer; a bottom backing layer on the opposite, second surface of the intermediate layer; and a chain stitch extending substantially parallel to and between adjacent warp yarns to connect the top layer to the bottom layer and thereby secure the warp yarns therebetween.

The above and other objects, features and advantages of the present invention will become readily apparent from the following detailed description which is to be read in connection with the accompanying drawings.

DETAILED DESCRIPTION OF THE PREFERRED EMBODIMENTS

Figure 1:
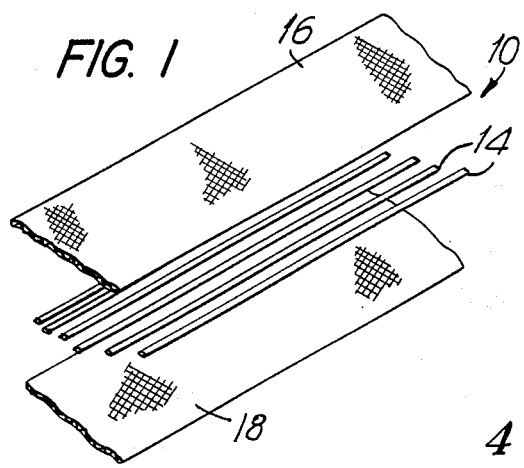
FIG. 1 is a perspective, blown-apart view of a fabric according to one embodiment of the present invention.
Figure 2:
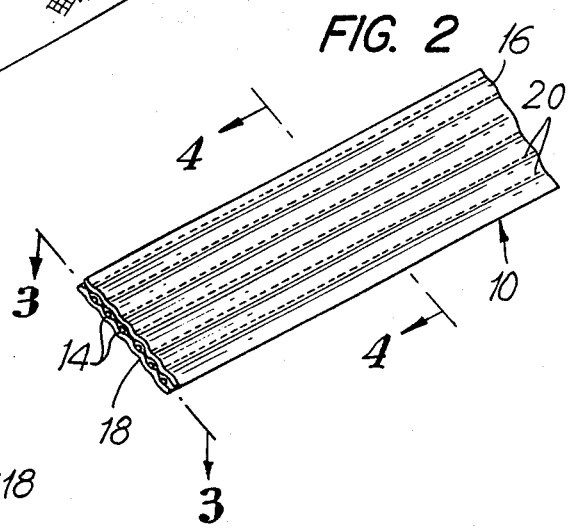
FIG. 2 is a perspective view of the fabric of FIG. 1 in assembled condition.
Figure 3:
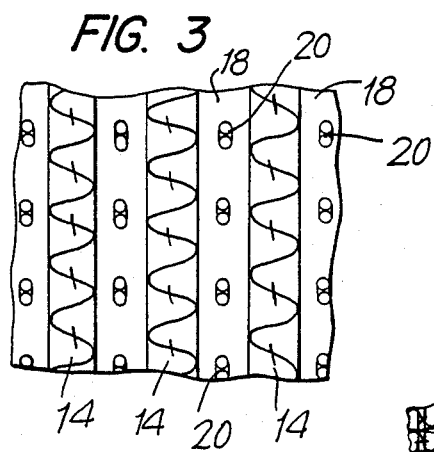
FIG. 3 is a cross-sectional view of the fabric of FIG. 2, taken along line 3—3 thereof.

Referring to the drawings in detail, and initially to FIG. 1 thereof, a fabric 10 according to a first embodiment of the present invention includes an intermediate layer 12 formed by a plurality of substantially parallel spum warp yarns 14 sandwiched between a top backing layer 16 and a bottom backing layer 18. Top and bottom backing layers 16 and 18 are secured together by chain stitching 20 that extends substantially parallel to and between adjacent warp yarns 14 so as to secure warp yarns 14 between top backing layer 16 and bottom backing layer 18, as shown in FIGS. 2 and 3.

Decorative warp yarns 14 are spun or filament warp yarns which can be made of any suitable fiber having a filament of 35–5,000 denier TOW. The spun warp yarns 14 can be spun 70s to the heaviest rovings or slivers. Top and bottom backing layers 16 and 18 can be made from spin bonds, spun laces, melt blown, wet lain, dry lay, thin films, elastomerics, light weight wovens, knits, needle felts and unbonded webs, or any combination of the above, and can use any suitable fiber for the same. Preferably, top and bottom backing layers 16 and 18 are formed from spun bonded non-woven yarns.

With such an arrangement, the filling strength is achieved by the spun bonded non-woven yarns of top and bottom backing layers 16 and 18, which also impart an abrasion resistance to fabric 10. For example, to satisfy the filling strength requirements of most drapery fabrics, spon bonded polyester of one half ounce per square yard can be used. The spun warp yarns 14 impart bulk, opacity and a uniform appearance to fabric 10.

Chain stitching 20 is formed by yarn having a filament of 50–1,500 denier, with there being approximately 3–30 stitches per inch. Chain stitching 20 can be formed from any and all fibers.

Figure 4:
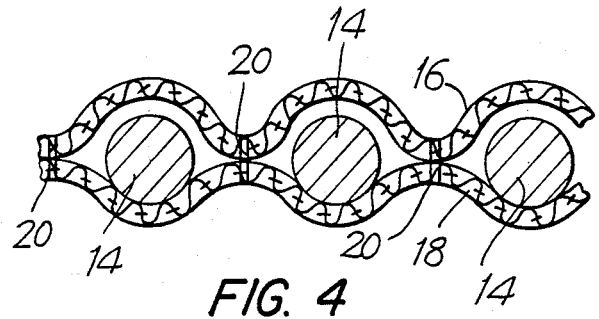
FIG. 4 is a cross-sectional view of the fabric of FIG. 2, taken along line 4—4 thereof.

Since warp yarns 14 are loose in the fabric structure, as shown in FIG. 4, fabric 10 should be processed further to bond warp yarns 14 to top and bottom backing layers 16 and 18. In this reagrd, chain stitching 20 holds intermediate layer 12, top backing layer 16 and bottom backing layer 18 together sufficiently for such further processing.

Such further processing can be achieved in a number of ways. For example, fusable elements such as a chemical, fiber or powder, can be applied to intermediate layer 12, top backing layer 16 and bottom backing layer 18 prior to final assembly. Then, heat is applied thereto to bond such layers together. Alternatively, fabric 10 can be resin saturated.

Figure 5:
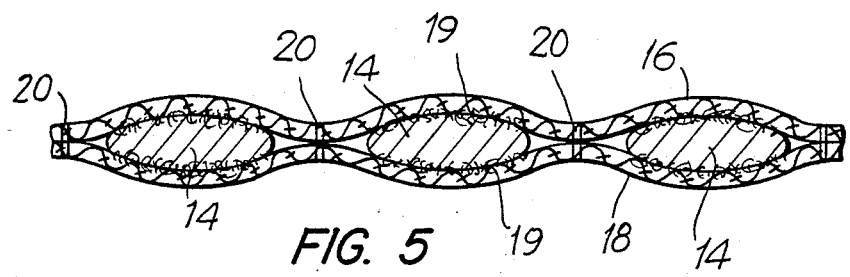
FIG. 5 is a cross-sectional view, showing the fabric of FIG. 4 after being hydro-entangled.

As a last method, fabric 10 can be hydraulically entangled (hydro-entangled) so as to adhere the loose warp yarns 14 to the spun bond non-woven yarns of top backing layer 16 and bottom backing layer 18, as shown at 19 in FIG. 5. In such hydro-entangling, if spun warp yarns 14 are composed of individual fibers or proper denier, crimp and length, and the spun bonded non-woven yarns of top backing layer 16 and bottom backing layer 18 are sufficiently thin to permit fiber migration through them, a suede or curdoroy type structure can be achieved.

Figure 6:
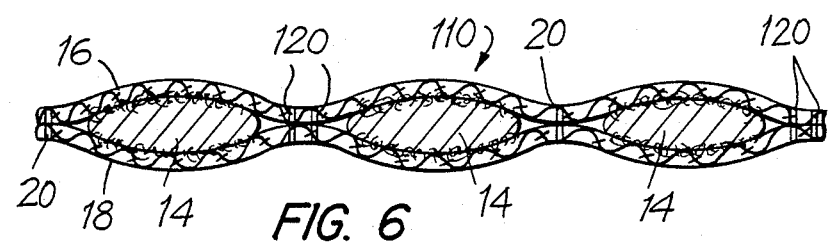
FIG. 6 is a cross-sectional view, similar to FIG. 4, of fabric according to another embodiment of the present invention.

An alternative fabric structure 110 is shown in FIG. 6 in which two lines of chain stitching 120 are provided between alternate adjacent spun warp yarns 14 to impart a different appearance to the resultant fabric. This fabric structure 110 also provides added dimensional stability to the fabric.

Figure 7:
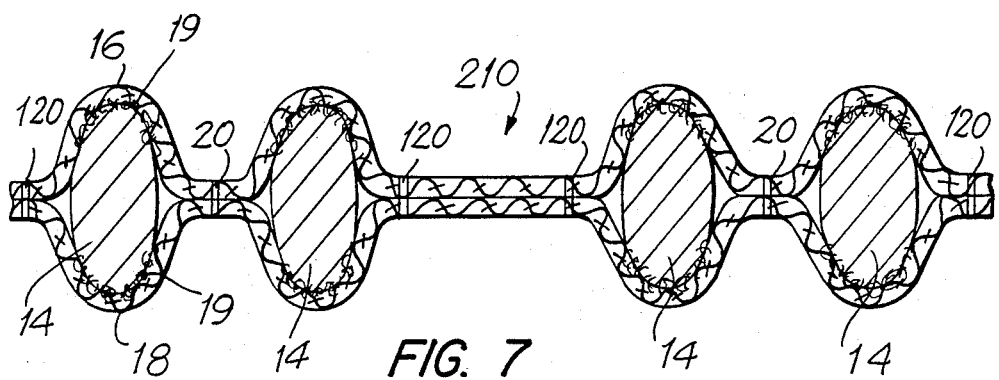
FIG. 7 is a cross-sectional view, similar to FIG. 4, of fabric according to still another embodiment of the present invention.

An alternative fabric structure 210 is shown in FIG. 7 which is similar to that of FIG. 6, with the exception that the two lines of chain stitching 120 are spaced from each other by a distance approximately equal to the diameter of a spun warp yarn 14, with no spun warp yarn 14 therebetween.

Thus, with the present invention, a novel fabric structure is provided having sufficient filling strength for vertical blinds, pleated shades, draperies, bedspreads and many apparel applications, without using any filling material. Such fabrics also have bulk, opacity and a uniform appearance. In addition, since such fabrics are chain stitched, they have greater dimensional stability than tricot stitched fabrics. Thus, the drapability of these fabric structures, unencumbered by filling elements, is superb. Also with the present invention, there is a great improvement in production efficiency. Specifically, there is no filling breakage and the machinery used to create the fabric can operate at maximum speed without regard to limitations forced thereon by the speed of the filling carriage.

The present invention can be used in various different types of machinery, either stitch bonding or weft insertion, for example, those manufactured by Malimo, Arachne, Libe, or Mayer.

It should also be noted that, in some cases, the need for further finishing can be eliminated. For example, when utilizing soft, hairy or lofty yarns, that is, boucles, the fiber elements of the yarn are stitched through by the needles and adhered to the structure, thereby eliminating the need for further finishing.

Also, in utilizing fiberglass or other industrial yarns for uni-directional composite structures, further processing may not be required.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined in the appended claims.

What is claimed is:

1. A fabric comprising:
   an intermediate layer of substantially parallel warp yarns, said intermediate layer having a first surface and an opposite, second surface;
   a top backing layer on said first surface of said intermediate layer;
   a bottom backing layer on the opposite, second surface of said intermediate layer; and
   a chain stitch extending substantially parallel to and between adjacent warp yarns to connect said top layer to said bottom layer and thereby secure said warp yarns therebetween.

2. A fabric according to claim 1; wherein said warp yarns are spun warp yarns.

3. A fabric according to claim 1; wherein said warp yarns have a denier in the range of 35-5,000.

4. A fabric according to claim 1; wherein at least one of said top and bottom backing layers are formed from materials selected from the group consisting of spun bonds, spun laces, melt blown, wet laid, dry lay, thin films, elastomerics, light weight wovens and knits, needle felts and unbonded webs.

5. A fabric according to claim 1; wherein each of said top and bottom backing layers are formed from spun bonded nonwoven yarns.

6. A fabric according to claim 5; wherein said spun bonded non-woven yarns have a weight of approximately one half ounce per square yard.

7. A fabric according to claim 1; wherein said warp yarns are bonded to said top and bottom backing layers.

8. A fabric according to claim 7; wherein said warp yarns are bonded to said top and bottom backing layers by a hydro-entangling process.

9. A fabric according to claim 7; further including heat fusable elements applied to said warp yarns and said top and bottom backing layers to bond said warp yarns to said top and bottom backing layers.

10. A fabric according to claim 7; wherein at least one of said warp yarns, top backing layer and bottom backing layer are resin saturated to provide said bonding between said warp yarns and said top backing layer and bottom backing layer.

11. A fabric according to claim 1; wherein said warp yarns are filament yarns.

* * * * *